United States Patent Office 3,216,991
Patented Nov. 9, 1965

3,216,991
6-GLYCINE BRADYKININ AND INTERMEDIATES THEREFOR
Miguel A. Ondetti, Highland Park, John T. Sheehan, Middlesex, and Miklos Bodanszky, Princeton, N.J., assignors to Olin Mathieson Chemical Corporation, New York, N.Y., a corporation of Virginia
No Drawing. Filed Jan. 29, 1962, Ser. No. 169,639
6 Claims. (Cl. 260—112.5)

This invention relates to new peptides, and more particularly to the new nonapeptide, L-arginyl-L-prolyl-L-prolyl-glycyl-L-phenylalanyl-glycyl - L - prolyl-L-phenyl-alanyl-L-arginine (hereinafter called 6-glycine bradykinin) and new intermediates from which it is made.

6-glycine bradykinin, the new final product of this invention, is a biologically active material, which possesses the same quantitative and qualitative activities as does bradykinin. The fact that the compound does have such activity is surprising, since it is well known that the biological activity of bradykinin is strictly dependent on the total structure of the compound and that even minor deviations from this structure lead to a complete loss or a substantial decrease in activity [Guttmann et al., Helv. Chim. Acta, 44, 1713 (1961)].

6-glycine bradykinin is prepared, according to the process of this invention, from simpler peptides, as more fully detailed in the following examples. The starting materials used are glycyl-L-proline and a protected form of L-phenylalanine (e.g., benzyloxycarbonyl L-phenylalanine nitrophenyl ester), whereby a new intermediate of this invention, benzyloxycarbonyl-L-phenylalanyl-glycyl-L-proline is obtained. From this tripeptide is then built, through new pentapeptides and heptapeptides of this invention, the final product of this invention, namely, 6-glycine bradykinin.

The following examples illustrate the process of this invention (all temperatures being in centigrade):

EXAMPLE 1

*Benzyloxycarbonyl-L-phenylalanyl-glycyl-L-proline*

A solution of 9.3 g. of glycyl-L-proline in 160 ml. of a pyridine-water mixture (1:1) is brought to pH 8.9 by the addition of 5 N sodium hydroxide. While stirring at room temperature alkali (5 N sodium hydroxide) and portions of 21 g. of benzyloxy carbonyl L-phenylalanine nitrophenyl ester are alternately added to maintain a pH 8.5. The addition is complete in 1 hour after which the mixture is stirred for an additional hour at room temperature. To this solution are then added 25 g. of sodium bicarbonate and 125 ml. of water, and the whole extracted ten times with 50 ml. portions of ethyl acetate. From the combined ethyl acetate extract an aqueous layer separates which is drawn off and added to the main aqueous layer. This aqueous solution is acidified with 6 N hydrochloric acid (Congo paper). An oil separates which quickly granulates. Filtered, washed with water and air dried, it weighs about 20.5 g. and melts at about 205–206°.

One gram of material, crystallized from 75 ml. of boiling ethanol, gives about 0.7 g. of product which melts about 212° and analyzes as follows:

*Analysis.*—Calcd. for $C_{24}H_{27}N_3O_6$: C, 63.56; H, 6.00; N, 9.27. Found: C, 63.51; H, 6.19; N, 9.52.

EXAMPLE 2

*Benzyloxycarbonyl-L-phenylalanyl-glycyl-L-proline nitrophenyl ester*

A solution of 15.5 g. (34 mmoles) of benzyloxycarbonyl-L-phenylalanyl-glycyl-proline and 5.3 g. of p-nitrophenol in 150 ml. of dimethylformamide is cooled to 0° in an ice-water bath and while stirring 7.2 g. of dicyclohexylcarbodiimide is added. The mixture is stirred at 0° for 2 hours and for an additional 3 hours at room temperature. After the addition of 0.5 ml. glacial acetic acid the insoluble dicyclohexyl urea is filtered off and washed with a small amount of ethyl acetate (it weighs about 4.3 g. and melts at about 231–233°). The filtrate and washings are combined and added with stirring to 1.5 liters of cold water. A semi-solid mass separates. The supernatant liquor is decanted and the residue taken up in 200 ml. of ethyl acetate and dried over anhydrous magnesium sulfate. The desiccant is filtered off and the solvent evaporated in vacuo leaving a glassy residue. This is repeatedly treated with ether, the solvent evaporated and this repeated until a solid, ether insoluble material is obtained. This (about 17 g.) is dissolved in 100 ml. of warm ethanol containing 1% acetic acid and filtered. On standing at room temperature about 5 g. of crystalline product separates. An additional 3.5 g. is obtained on long standing in the cold (—5°). This ester softens at about 65° and melts at about 85–90°; $[\alpha]_D^{26}$ —87.5° (c. 1 dimethylformamide containing 1% acetic acid).

*Analysis.*—Calcd. for $C_{30}H_{30}N_4O_8$: C, 62.71; H, 5.26; N, 9.75. Found: C, 62.72; H, 5.14; N, 9.78.

EXAMPLE 3

*Methyl benzyloxycarbonyl-L-phenylalanyl-glycyl-L-prolyl-L-phenylalanyl-nitro-L-argininate*

A solution of hydrobromic acid in acetic acid (36%—36 ml.) is added to a suspension of methyl benzyloxycarbonyl-L-phenylalanyl-nitro-L-argininate (5.5 less g.) in acetic acid (40 ml.) and freeze-dried after one hour. The solid residue is dissolved in dimethylformamide (14 ml.), benzyloxy-carbonyl - L - phenylalanyl-glycyl-L-proline p-nitrophenyl ester (5.75 g.) is added and the mixture is made alkaline with tributylamine (4.5 ml.) and triethylamine (1 ml.). After two and a half days at room temperature the reaction mixture is diluted with ethyl acetate, washed once with N hydrochloric acid, once with water, six times with N ammonium hydroxide and four times with water. The solution is dried over magnesium sulfate and the solvent removed in vacuo. The residue is crystallized from ethyl acetate. The protected pentapeptide ester (about 5.95 g.) melts at about 114–116°; $[\alpha]_D$ —57.7° (c. 1.1 dimethylformamide).

*Analysis.*—Calcd. for $C_{40}H_{49}N_9O_{10}$: C, 58.87; H, 6.05; N, 15.45. Found: C, 58.67; H, 6.27; N, 15.01.

EXAMPLE 4

*Methyl benzyloxycarbonyl-L-prolyl-glycyl-L-phenylalanyl-glycyl-L-prolyl-L-phenyl-alanyl-nitro-L-argininate*

The benzyloxycarbonyl group is removed from methyl-N - benzyloxycarbonyl-L-phenylalanyl-glycyl-L-prolyl-L-phenylalanyl-nitro-L-arginate (4.88 g.) by the method described in Example 3. The solid residue obtained after freeze-drying is dissolved in dimethylformamide (12 ml.), and benzyloxycarbonyl-L-prolyl-glycine p-nitrophenyl ester (2.84 g.), tributylamine (2.8 ml.) and triethylamine (1 ml.) are added. After two and a half days at room temperature the reaction mixture is diluted with ethyl acetate and washed with N hydrochloric acid, water, N ammonium hydroxide and water as described in Example 3. The ethyl acetate solution is dried over magnesium sulfate and the solvent removed in vacuo. The residue is dissolved in methanol and precipitated with ether. The protected heptapeptide ester has no well-defined melting point, it melts at about 126–134°; $[\alpha]_D^{20}$ —54.5° (c. 1.0 dimethylformamide).

*Analysis.*—Calcd. for $C_{47}H_{59}N_{11}O_{12}$: C, 58.20; H, 6.13; N, 15.88. Found: C, 58.11; H, 6.19; N, 15.64.

EXAMPLE 5

*Methyl Nα-benzyloxycarbonyl-nitro-L-arginyl-L-prolyl-L-prolyl-glycyl-L-phenyl-alanyl-glycyl-L-prolyl-L-phenylalanyl-nitro-L-argininate*

The benzyloxycarbonyl group is removed from methyl benzyloxycarbonyl-L-prolyl-glycyl-L-phenylalanyl-glycyl-L-prolyl-L-phenylalanyl-nitro-L-argininate (3.7 g.) by the method described in Example 3. The solid residue obtained after freeze-drying is dissolved in dimethylformamide (7.5 ml.) and Nα-benzyloxycarbonyl-nitro-L-arginyl-L-proline p-nitrophenyl ester (2.2 g.), tributylamine (2.5 ml.) and triethylamine (0.4 ml.) are added and the solution kept at room temperature for four and a half days. The reaction mixture is diluted with ethyl acetate-acetonitrile (2:1), washed once with N hydrochloric acid, three times with water and dried over magnesium sulfate. After removing the solvent in vacuo the oily residue is triturated with ethyl acetate after it turns into a solid (about 2.75 g., M.P. about 115–135°).

A small sample is dissolved in methanol and precipitated with ethyl acetate (M.P. about 135–150°, softening at about 120°); $[\alpha]_D^{20}$ —57.3 (c. 1.0 dimethylformamide).

*Analysis.*—Calcd. for $C_{58}H_{77}N_{17}O_{16}$: C, 54.92; H, 6.12; N, 18.77. Found: C, 54.72; H, 6.31; N, 18.73.

EXAMPLE 6

*L-arginyl-L-prolyl-L-prolyl-glycyl-L-phenylalanyl-glycyl-L-prolyl-L-phenylalanyl-L-arginine*

To a solution of methyl Nα-benzyloxycarbonyl-nitro-L-arginyl-L-prolyl-L-prolyl-glycyl-L-phenylalanyl-glycyl-L-prolyl-L-phenylalanyl-nitro-L-arginate (130 mg.) in methanol (2 ml.) and water (0.3 ml.), a solution of 2 N sodium hydroxide (0.15 ml.) is added. After two hours at room temperature, water (1 ml.) is added. The solution is left for fifteen minutes at room temperature and then another milliliter of water is added. After a total of two and a half hours the solution is acidified and kept overnight in the refrigerator. The supernatant is decanted and the residue treated with hot methanol when it becomes crystalline and insoluble. The mixture is cooled, filtered and the product is washed with methanol (about 83.4 mg., M.P. about 155–170°, sintering at about 150°).

This partially protected nonapeptide is dissolved in a mixture of acetic acid-water (2:1) (12 ml.) and hydrogenated at normal pressure for 48 hours using 5% palladium on barium sulfate as a catalyst. After removal of the catalyst by filtration the solvents are removed in vacuo, the residue dissolved in water and freeze-dried. The free nonapeptide (about 75 mg.) is homogeneous on paper chromatograms (butanol-acetic acid-water, 4:1:5).

This invention may be variously otherwise embodied within the scope of the appended claims.

What is claimed is:

1. L-arginyl-L-prolyl-L-prolyl-glycyl-L-phenylalanyl-glycyl-L-prolyl-L-phenylalanyl-L-arginine.
2. Benzyloxycarbonyl-L-phenylalanyl-glycyl-L-proline.
3. Benzyloxycarbonyl-L-phenylalanyl-glycyl-L-proline nitrophenyl ester.
4. Methyl benzyloxycarbonyl-L-phenylalanyl-glycyl-L-prolyl-L-phenylalanyl-nitro-L-argininate.
5. Methyl benzyloxycarbonyl-L-prolyl-glycyl-L-phenylalanyl-glycyl-L-prolyl-L-phenylalanyl-nitro-L-argininate. argininate.
6. Methyl Nα-benzyloxycarbonyl-nitro-L-arginyl-L-prolyl-L-prolyl-glycyl-L-phenylalanyl-glycyl-L-prolyl-L-phenylalanyl-nitro-L-argininate.

References Cited by the Examiner

UNITED STATES PATENTS

| 2,793,204 | 5/57 | Arens. |
| 2,854,443 | 9/58 | Boissonnas. |

OTHER REFERENCES

Fruton: Advances in Protein Chemistry, vol. 5, pp. 21–33 and 72–64 (1949).

Greenberg: Amino Acids and Proteins, pp. 863–866 (1951).

Konzett: Nature, vol. 188, page 998 (1960).

Silva: Amer. J. Physiol., vol. 156, pp. 261–273 (1942).

LEWIS GOTTS, *Primary Examiner.*

LEON ZITVER, *Examiner.*